United States Patent [19]

Andregg

[11] 4,152,808
[45] May 8, 1979

[54] HEATING UNIT FOR WINDSHIELD WIPER
[75] Inventor: James Andregg, Eagle, Id.
[73] Assignee: Clear-Vu, Inc., Nampa, Id.
[21] Appl. No.: 876,485
[22] Filed: Feb. 9, 1978
[51] Int. Cl.² ............................................... B60S 1/04
[52] U.S. Cl. .................................. 15/250.07; 15/250.42
[58] Field of Search ........... 15/250.05, 250.09, 250.36, 15/250.42

[56] References Cited
U.S. PATENT DOCUMENTS

| | | | |
|---|---|---|---|
| 1,641,336 | 9/1927 | Klapper | 15/250.08 |
| 1,937,286 | 11/1933 | McCarthy | 15/250.09 |
| 2,703,902 | 3/1955 | Thomas et al. | 15/250.09 |
| 2,755,499 | 7/1956 | Mays | 15/250.06 |
| 3,958,295 | 5/1976 | Green et al. | 15/250.42 |

Primary Examiner—Peter Feldman
Attorney, Agent, or Firm—Bernard Stickney

[57] ABSTRACT

A windshield wiper unit adapted to be secured to conventional wiper mechanisms and to retain conventional wiper blades while providing heat to both for the prevention of icing. The unit is of molded nylon having very thin resistance ribbon wires embedded in portions that engage the side channels of the wiper blades. Centrally embedded in the unit is a Frieon-heat sensitivity control for the electrical system that completes the operational capability of the unit.

5 Claims, 5 Drawing Figures

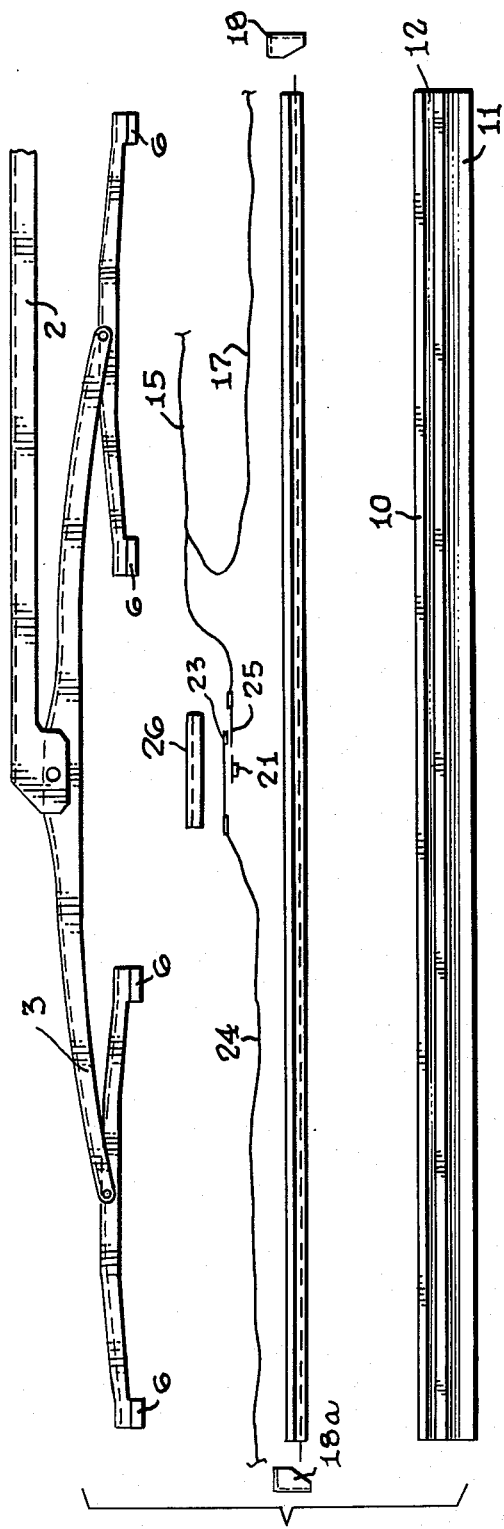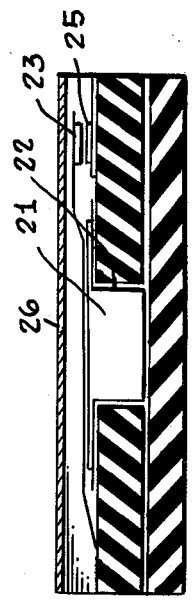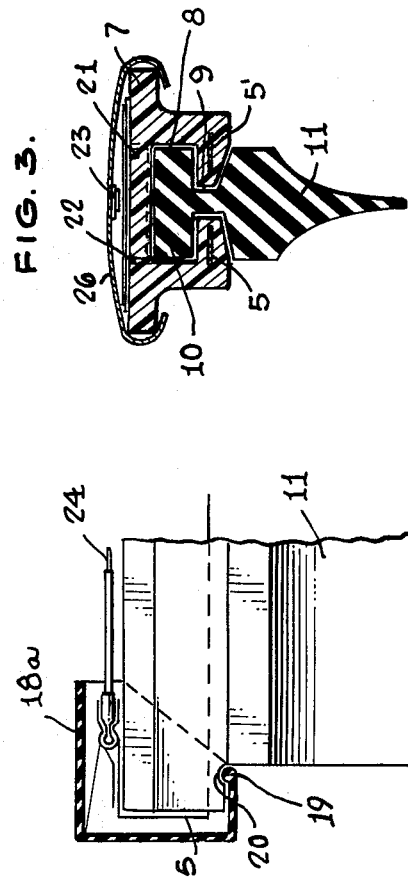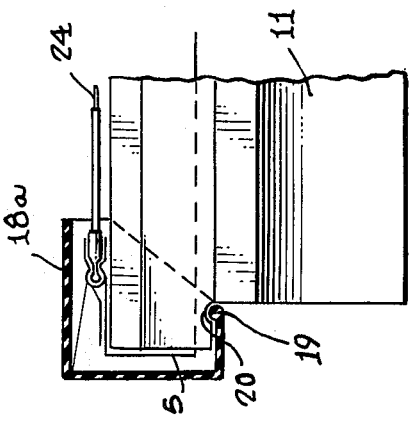

HEATING UNIT FOR WINDSHIELD WIPER

BACKGROUND OF THE INVENTION

The invention relates to improvements in windshield wiper mechanisms for operation in cold weather. The problem of the formation of ice leading to the stoppage of either the pressure mechanism or the effective squegee action of the wiper blade is a serious one for the average family car but especially so for trucks and other vehicles which must continue to operate during snowstorms. Heated air supplied to the windshield from the interior of the car is generally inadequate in severe wintry conditions.

Many solutions have been attempted by supplying heat directly to the wiper system. These include embedding electric resistance elements in the wiper blade as in U.S. Pat. Nos. 3,718,940 and 3,936,901. Another approach is to supply heat to the backing member which grips the wiper blade. U.S. Pat. No. 3,408,678 does it by making the backing member itself a nichrome resistance element while U.S. Pat. No. 3,530,525 provides a heating wire in contact with the metal backing element.

A further solution has been attempted by forming envelopes about the wiper parts as in U.S. Pat. No. 3,523,626 where both the supporting pressure applying mechanism and a major portion of the wiper blade are enclosed in an envelope containing a liquid which is electrically heated. In U.S. Pat. No. 3,619,556, a heating element embedded in the wiper blade is in contact with a portion of an envelope which encloses the backing element and an upper portion of the wiper-blade.

The foregoing attempted solutions are inadequate for various reasons. In modifications involving embedded resistance elements in the wiper blade, the latter is stiffened and does not flex properly when in operation. The heat produced tends to be excessive and quickly deteriorates the rubber of the blade. When the wiper blade needs replacement, it is expensive to replace the unit with the resistance element being discarded too. Where heat is applied to the backing element, it is not sufficiently close to the squegee portion of the wiper blade. In other modifications, the envelopes are bulky, presenting flexing problems and are expensive.

Accordingly it is the primary object of this invention to provide an improved heating unit which may be adapted to existing windshield wiper mechanisms and wiper blades and provide heat to both, sufficient to prevent ice formation causing malfunction of the wiper assembly.

Another object of this invention is to provide an improved hearting unit which is flexible and allows full normal flexure of the wiper blade.

A further object of this invention is to provide an improved heating unit having a heat sensitivity control unit to prevent the overheating of the wiper blade.

A still further object of this invention is to provide an improved heating unit for a windshield wiper which is relatively inexpensive and allows normal wiper blade replacements to be made without discarding the electric resistance element.

BRIEF DESCRIPTION OF THE DRAWINGS

These and other objects and advantages of the invention will subsequently become apparent from the following detailed description when read in conjunction with the accompanying drawings wherein:

FIG. 2 is an exploded view of the windshield wiper assembly elements.

FIG. 3 is a cross-sectional view taken along line 3-3 of FIG. 1.

FIG. 4 is a side elevation view partially in section of the upper end cap.

FIG. 5 is a side elevation view partially in section of the heat sensitivity control unit.

DETAILED DESCRIPTION OF THE INVENTION AND DRAWINGS

Figure 1:
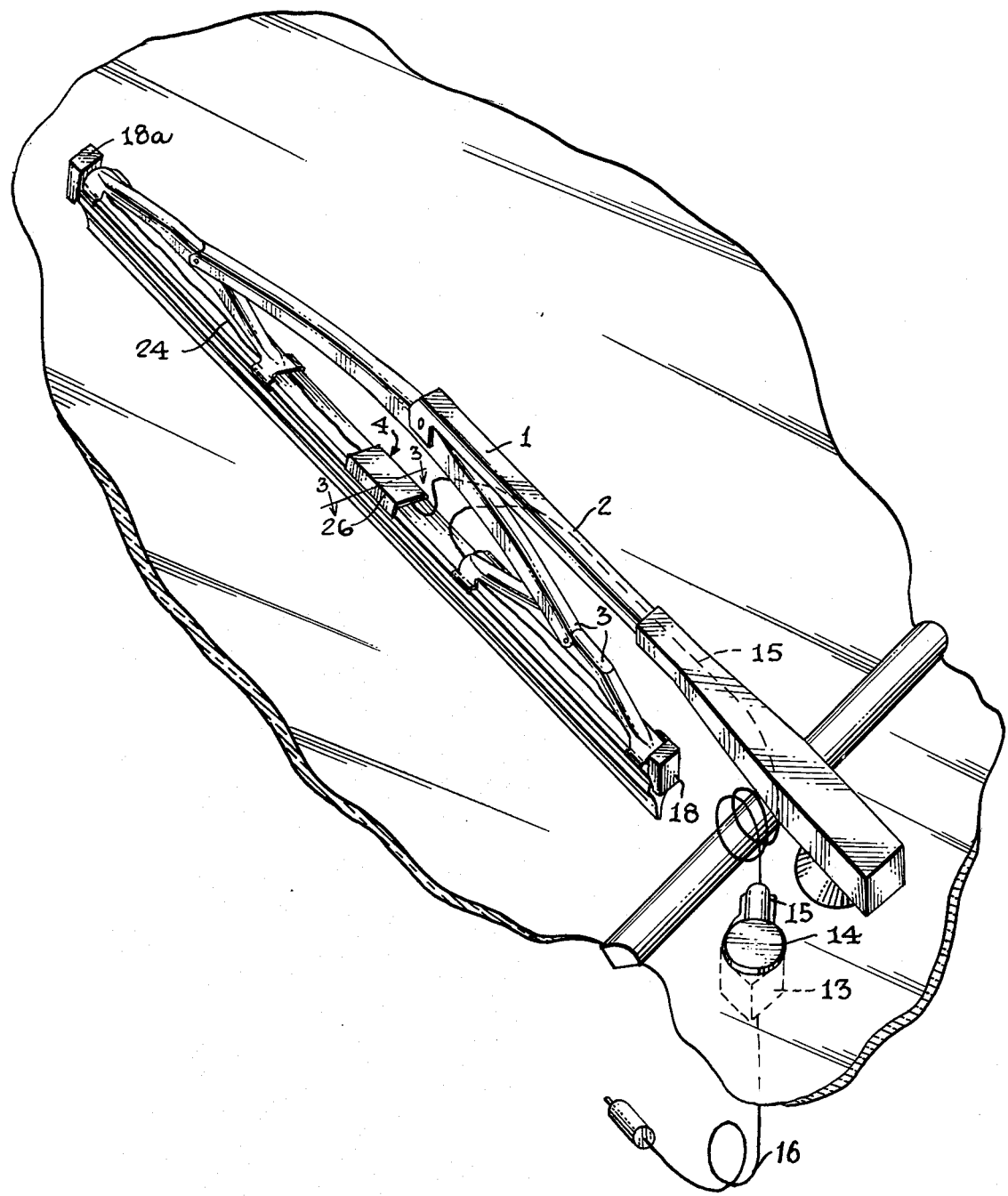
FIG. 1 is a perspective view of the complete windshield wiper assembly.

Referring now more specifically to the drawings, FIG. 1 shows a completely assembled windshield wiper generally indicated at 1, having an oscillating arm 2 and pressure applying and distributing linkages 3. The heating unit 4 is preferably made of Nylon and is extrusion molded with a ribbon of electric resistance material 5 embedded in wing portions 7 as best seen in FIG. 3. The resistance element 5 is an iron-chromium-aluminum alloy that is 0.005 in. thick and ⅛ in. wide. A specific preferred composition is 815 Alloy made by the Hoskins Manufacturing Company of Detroit, Michigan.

Clips 6 on the pressure applying linkage 3 grip the wings 7 of the heating unit to secure it in its assembled operating position. The heating unit 4 has a chamber 8 and open neck position 9 running the full length of the unit. As shown in FIGS. 2 and 3, the conventional rubber wiper blade has a thickened head portion 10 integrally connected to the squeegee tip of the blade 11 and thereby forming two grooves 12. The blade is connected to the heating unit by inserting it at one end of the unit and sliding it along chamber 8 into the assembled relationship shown in FIG. 3.

To provide electrical power for the heating unit, a conventional jack receptacle 13 is mounted on the vehicle with a right angle jack 14 inserted therein. From the jack a double lead-in wire 15 extends along the heating unit. Wire 16 is connected to a power source. Branch wire 17 of the lead-in wire 15 is connected to resistance element 5 through a bottom cap 18. This cap, a reverse duplicate of cap 18a shown in FIG. 4, has a pressure clip to receive the wire. The clip is connected to a continuation of the resistance element 5. Cap 18 may be permanently sealed with silicone rubber to prevent the entry of moisture. The caps, made of Nylon, are pressure fitted about the ends of the heating unit by molded elements 19 engaging recesses 20 in the heating unit. Upper cap 18a is readily removeable for the replacement of the wiper blade and should therefore have a removeable moisture seal.

Located centrally is a heat sensitive control unit 21 in an opening 22 in the heating unit. The unit contains Freon of a composition that will expand upon the desired heating temperature being reached to open contact 23 from contact 25. Contact 23 is connected to wire 24 leading to upper cap 18a while contact 25 is connected to one of the lead-in wires 15. A Nylon cap 26 covering the control unit 21 exerts resilient pressure to normally keep the contracts 23, 25 in the closed position.

The operation and advantages of the foregoing described invention is self-evident. A vehicle owner can install the heating unit himself by removing the wiper blade on his windshield wiper and replacing it with heating unit 4, replacing the wiper blade in the unit, fitting the end caps and providing an electrical connection to a power source.

The heating unit is both durable and flexible by reason of the preferred plastic material, Nylon, while the electric resistance ribbon is also very flexible, thus presenting no impedence to the normal flexing squeegee action of the wiper blade. The unit will last for many years requiring only replacement of worn wiper blades. The heating unit provides heat both to the pressure applying linkages and the wiper blade. The control unit 21 prevents overheating and premature deterioration of the wiper blade. For extremely cold areas the thickness of the resistance ribbon can be slightly changed to provide more heat and the Freon composition in the control unit changed accordingly.

While the preferred construction and materials have been shown and described herein, other changes in the details may be made, but it is to be understood that such changers will be made within the spirit and scope of the present invention.

I claim:

1. A heating unit for a windshield wiper assembly having pressure applying linkage elements comprising:

a longitudinal resilient element having a flat upper surface with lateral wing portions adapted to be secured by the pressure applying linkage elements, integral portions downwardly depending and then horizontally extending inwardly forming a rectangular chamber with an open necked portion adapted to receive a wiper blade and a thin, flat resistance element embedded in each of said inwardly extending portions and extending longitudinally and parallel to said upper surface.

2. A heating unit as defined in claim 1 wherein the resistance element is an iron chromium-aluminum alloy.

3. A heating unit as defined in claim 2 wherein the resistance element is a ribbon 0.005 in. thick and ⅛ in. wide.

4. A heating unit as defined in claim 1 having end caps providing electrical connecting means to said electric resistance element.

5. A heating unit as defined in claim 1 wherein a heat sensitive control means for regulating the temperature produced by said resistance element is located on said longitudinal resilient element.

* * * * *